United States Patent [19]

Stifter

[11] Patent Number: 4,999,729
[45] Date of Patent: Mar. 12, 1991

[54] SATELLITE RECEIVER PROTECTION APPARATUS

[76] Inventor: Francis J. Stifter, 171 S. Main St., Natick, Mass. 01760

[21] Appl. No.: 391,336

[22] Filed: Aug. 9, 1989

[51] Int. Cl.$^5$ ............................................. H02H 9/06
[52] U.S. Cl. ..................................... 361/56; 361/111; 361/118
[58] Field of Search .................. 361/111, 110, 58, 117, 361/118, 127, 126

[56] References Cited

U.S. PATENT DOCUMENTS

| | | | |
|---|---|---|---|
| 4,259,705 | 3/1981 | Stifter | 361/56 |
| 4,630,163 | 12/1986 | Cooper et al. | 361/111 |
| 4,807,083 | 2/1989 | Austin | 361/111 |
| 4,878,145 | 10/1989 | Lace | 361/118 |

Primary Examiner—Todd E. DeBoer
Attorney, Agent, or Firm—John E. Toupal; Harold G. Jarcho

[57] ABSTRACT

A satellite receiver protection apparatus including a housing; an electrical power supply connector retained by the housing and adapted for connection to an AC outlet; a plurality of AC outlet sockets retained by the housing; and an electrical power surge suppressor retained within the housing and connected between the supply connector and the outlet sockets. Also included are an electrical input terminal retained by the housing and adapted for connection to a television antenna; an electrical output terminal retained by the housing and adapted for connection to a television receiver; and an electrical signal surge suppressor retained within the housing and connected between the input terminal and the output terminal.

20 Claims, 1 Drawing Sheet

4,999,729

SATELLITE RECEIVER PROTECTION APPARATUS

BACKGROUND OF THE INVENTION

This invention relates generally to electrical protection equipment and, more particularly, to a compact unit for protecting television equipment from various types of electrical problems.

The performance of in-house equipment typically used with satellite dish receivers is often diminished by various electrical abnormalities. For example, television receivers and accessory devices can be damaged by spikes and surges due to power company transients, switching gear transients, lightning spikes and transients from spherics. In addition, electrical interference frequently affects detrimentally television reception quality or disrupts the data stored in receiver memories for co-ordinate information or other recallable data available on particular satellite receivers.

The object of this invention, therefore, is to provide a versatile, compact unit that will protect satellite equipment from various types of electrical problems.

SUMMARY OF THE INVENTION

The invention is a satellite receiver protection apparatus including a housing; an electrical power supply connector retained by the housing and adapted for connection to an AC outlet; a plurality of AC outlet sockets retained by the housing; and an electrical surge suppressor retained within the housing and connected between the supply connector and the outlet sockets. Also included are an electrical input terminal retained by the housing and adapted for connection to a television antenna; an electrical output terminal retained by the housing and adapted for connection to a television receiver; and an electrical signal surge suppressor retained within the housing and connected between the input terminal and the output terminal. This arrangement provides protection from surges and spikes appearing on either power company lines or lines from a television antenna.

According to one feature, the invention also includes a ground circuit retained by the housing and connected to the power and signal surge suppressors, a plurality of first control terminals retained by the housing and adapted for connection to orientation motor and sensor lines of a satellite dish antenna, a plurality of second control terminals retained by the housing and adapted for connection to a satellite dish antenna orientation control unit, control lines retained by said housing and connecting the first and second control terminals, and a control line surge suppressor retained within the housing and connected between the control lines and the ground circuit. This feature accommodates satellite dish orientation control equipment and provides surge protection therefor.

According to another feature, the invention further includes an electrical filter retained within the housing and connected between the supply connector and the outlet sockets. The filter reduces common mode and differential mode low level interference to equipment connected to the sockets.

According to an additional feature of the invention, the ground circuit includes a ground terminal retained by the housing. The ground terminal facilitates grounding of accessory equipment.

According to yet other features of the invention, the sockets are disposed in a top wall of the housing, the first terminals are disposed in one side wall of the housing, and the second terminals are disposed in a different side wall of the housing. These features simplify interconnection of different components of a television system.

According to a further feature, the invention includes a plurality of input terminals each adapted for connection to a different television antenna, a plurality of output terminals each adapted for connection to a different television receiver, and a signal surge suppressor connected between each pair of said input and output terminals. This feature provides surge protection for multiple antenna television systems.

According to important features of the invention, the input and output terminals are coaxial terminals and the signal surge suppressor includes a varistor connected between ground and the outer conductors of the terminals and a gas tube connected between center and outer conductors thereof. The varistor establishes surge protection for the outer conductor while the gas tube protects the signal carrying center conductor.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
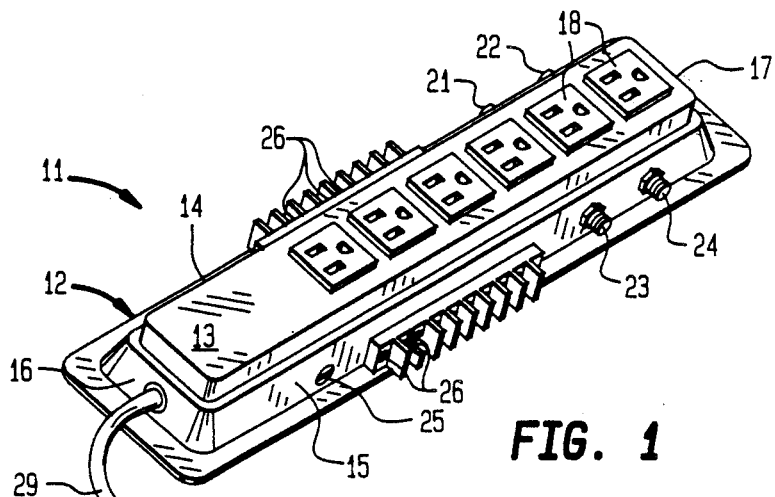
FIG. 1 is a perspective view of a satellite protection unit according to the invention.

A satellite protection unit 11 according to the invention is illustrated in FIG. 1. A compact, elongated and portable housing 12 has a top wall 13, a pair of side walls 14, 15 and a pair of end walls 16, 17. Retained in the top wall 13 are a plurality of three-wire AC outlet sockets 18. The side wall 14 retains a plurality of electrical, coaxial input terminals 21, 22 adapted for receiving television signals from various sources such as satellite dish antennas, local television antennas or cable. Associated with the input terminals 21, 22, respectively, are electrical, coaxial output terminals 23, 24 retained in the side wall 15 and adapted to feed television receiver equipment. Also retained in the side wall 15 is a ground terminal 25 connected to the ground contacts of the sockets 18 within the housing 12. A first plurality of control terminals 26 are mounted as a strip in the side wall 14. Connected to the first control terminals 26 in a bi-directional manner within the housing 12 are a second plurality of control terminals 27 mounted as a strip in the side wall 15. The control terminals 26, 27 are adapted for connection to equipment for controlling the orientation of a satellite dish antenna. Extending into the housing 12 through the end wall 16 is a three-wire cord and plug 29 adapted for connection to an AC power outlet.

Figure 2:
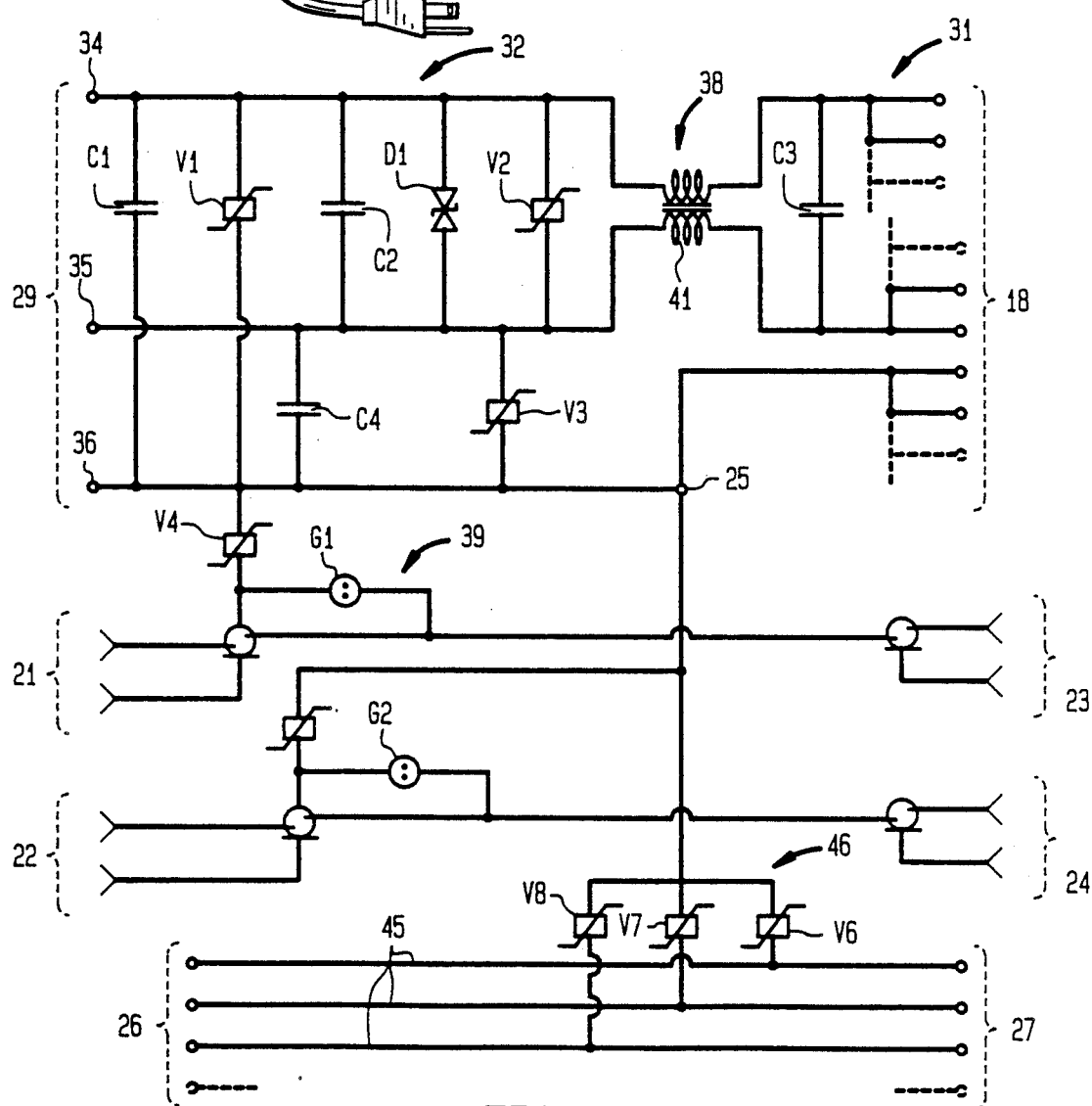
FIG. 2 is a diagram of an electrical circuit used in the unit shown in FIG. 1.

Illustrated in FIG. 2 is an electrical circuit 31 interconnecting the sockets 18, terminals 23–27 and cord 29 shown in FIG. 1. A power surge suppressor system 32 is connected between the cord 29 and the sockets 18 which are connected in parallel. Included in the suppressor system 32 are varistors V1, V2 and a diode D1, each connected across hot 34 and neutral 35 lines of the cord 29 and a varistor V3 connected across the neutral and ground 36 lines of the cord 29. The ground line 36 is connected also to the ground terminal 25 on the housing 12. Also included in the circuit 32 is an electrical filter system 38 including a toroid filter 41 connected between the lines 34, 35 and the power contacts of the sockets 18; an inductive coil connected between the ground line 36 and the ground contacts of the sockets 18; capacitors C1, C2 connected in parallel across the lines 34, 35, a capacitor C3 connected across the power contacts of the sockets 18; and a capacitor C4 connected across the lines 35, 36.

The circuit 31 also includes a signal surge suppressor system 39 connected between the input terminals 21, 22 and the output terminals 23, 24. A varistor V4 is connected between the ground terminal 25 and the outer conductor of the terminals 21 and 23 and a varistor V5 is connected between ground terminal 25 and the outer conductor of the terminals 22 and 24. Also included in the system 39 are gas tubes G1, G2 connected, respectively, between the outer and center conductors of the terminals 21 and 23 and the terminals 22 and 24. The varistors V4, V5 provide surge protection for the outer conductors while the very low loss gas tubes G1, G2 protect the signal carrying center conductors.

Finally included in the circuit 31 are control signal lines 45 each connected between one pair of the first and second control terminals 26, 27 and a control surge suppressor system 46. The system 46 includes a varistor V6–V8 connected between the ground terminal 25 and each of the control signal lines 45. Since the control lines 45 are bi-directional, either the terminals 26 or the terminals 27 can be used as input terminals.

Obviously, many modifications and variations of the present invention are possible in light of the above teachings. It is to be understood, therefore, that the invention can be practiced otherwise than as specifically described.

What is claimed is:

1. A satellite receiver protection apparatus comprising:
    a housing;
    electrical power supply connection means retained by said housing and adapted for connection to an AC outlet;
    a plurality of AC outlet sockets retained by said housing;
    electrical power surge suppressor means retained within said housing and connected between said supply means and said outlet sockets;
    electrical input terminal means retained by said housing and adapted for connection to a satellite dish antenna;
    electrical output terminal means retained by said housing and adapted for connection to a television receiver;
    electrical signal surge suppressor means retained within said housing and connected between said input terminal means and said output terminal means;
    ground circuit means retained by said housing and connected to said power and signal surge suppressor means;
    a plurality of first control terminals retained by said housing and adapted for connection to orientation motor and sensor lines of the satellite dish antenna;
    a plurality of second control terminals retained by said housing and adapted for connection to the satellite dish antenna orientation control unit;
    control line means retained by said housing and connecting said first and second control terminals; and
    control line surge suppressor means retained within said housing and connected between said control line means and said ground circuit means.

2. An apparatus according to claim 1 including ground circuit means retained by said housing and connected to said power and signal surge suppressor means, a plurality of first control terminals retained by said housing and adapted for connection to orientation motor and sensor lines of a satellite dish antenna, a plurality of second control terminals retained by said housing and adapted for connection to a satellite dish antenna orientation control unit, control line means retained by said housing and connecting said first and second control terminals and control line surge suppressor means retained within said housing and connected between said control line means and said ground circuit means.

3. An apparatus according to claim 1 or 2 including electrical filter means retained within said housing and connected between said supply connection means and said outlet sockets.

4. An apparatus according to claim 3 wherein said ground circuit means comprises a ground terminal retained by said housing.

5. An apparatus according to claim 4 wherein said sockets, said first and second control terminal means, and said ground terminal are accessible externally on said housing.

6. An apparatus according to claim 5 wherein said sockets are disposed in a top wall of said housing, said first terminals are disposed in one side wall of said housing, and said second terminals are disposed in a different side wall of said housing.

7. An apparatus according to claim 6 wherein said power supply connection means comprises an AC plug having hot, common, and ground contacts and said ground contact is connected to said ground circuit means.

8. An apparatus according to claim 1 or 2 wherein said input terminal means comprises a plurality of input terminals each adapted for connection to a different television antenna, said output terminal means comprises a plurality of output terminals each adapted for connection to a different television received, and said signal surge suppressor means comprises a plurality of signal surge suppressors, one connected between each pair of said input and output terminals.

9. An apparatus according to claim 8 including electrical filter means retained within said housing and connected between said supply connection means and said outlet sockets.

10. An apparatus according to claim 9 wherein said ground circuit means comprises a ground terminal retained by said housing.

11. An apparatus according to claim 10 wherein said sockets, said first and second control terminal means, and said ground terminal are accessible externally on said housing.

12. An apparatus according to claim 11 wherein said sockets are disposed in a top wall of said housing, said first terminals are disposed in one side wall of said housing, and said second terminals are disposed in a different side wall of said housing.

13. An apparatus according to claim 12 wherein said power supply connection means comprises an AC plug having hot, common, and ground contacts and said ground contact is connected to said ground circuit means.

14. An apparatus according to claim 1 including ground circuit means and wherein said input and output terminals are coaxial terminals and said signal surge suppressor means comprises varistor means connected between said ground circuit and outer conductors of said input and output terminals, and gas tube means connected between center and outer conductors of said input and output terminals.

15. An apparatus according to claim 14 wherein said ground circuit means comprises a ground terminal retained by said housing.

16. An apparatus according to claim 15 wherein said sockets, said first and second control terminal means, and said ground terminal are accessible externally on said housing.

17. An apparatus according to claim 16 wherein said sockets are disposed in a top wall of said housing, said first terminals are disposed in one side wall of said housing, and said second terminals are disposed in a different side wall of said housing.

18. An apparatus according to claim 17 wherein said power supply connection means comprises an AC plug having hot, common, and ground contacts and said ground contact is connected to said ground circuit means.

19. An apparatus according to claim 14 wherein said input terminal means comprises a plurality of input terminals each adapted for connection to a different television antenna, said output terminal means comprises a plurality of output terminals each adapted for connection to a different television receiver, and said signal surge suppressor means comprises a plurality of signal surge suppressors, one connected between each pair of said input and output terminals.

20. A television receiver protection apparatus comprising:
   a housing;
   electrical power supply connection means retained by said housing and adapted for connection to an AC outlet;
   a plurality of AC outlet sockets retained by said housing;
   electrical power surge suppressor means retained within said housing and connected between said supply means and said outlet sockets;
   ground circuit means connected to said power surge suppressor means;
   coaxial electrical input terminal means retained by said housing and adapted for connection to a television antenna;
   coaxial electrical output terminal means retained by said housing and adapted for connection to a television receiver; and
   electrical signal surge suppressor means retained within said housing and connected between said input terminal means and said output terminal means; said signal surge suppressor means comprising varistor means connected between said ground circuit means and outer conductors of said input and output terminals, and gas tube means connected between center and outer conductors of said input and output terminals.

* * * * *